(12) United States Patent
Boon et al.

(10) Patent No.: US 10,390,042 B2
(45) Date of Patent: Aug. 20, 2019

(54) MOVING IMAGE PREDICTION ENCODING/DECODING SYSTEM

(71) Applicant: NTT DOCOMO, INC., Tokyo (JP)

(72) Inventors: Choong Seng Boon, Tokyo (JP); Yoshinori Suzuki, Tokyo (JP); Akira Fujibayashi, Tokyo (JP); Thiow Keng Tan, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/213,684

(22) Filed: Dec. 7, 2018

(65) Prior Publication Data

US 2019/0116378 A1    Apr. 18, 2019

Related U.S. Application Data

(63) Continuation of application No. 14/822,657, filed on Aug. 10, 2015, now Pat. No. 10,178,407, which is a
(Continued)

(30) Foreign Application Priority Data

Mar. 17, 2010    (JP) .................. 2010-061337

(51) Int. Cl.
*H04N 19/573*    (2014.01)
*H04N 19/172*    (2014.01)
(Continued)

(52) U.S. Cl.
CPC ......... *H04N 19/573* (2014.11); *H04N 19/107* (2014.11); *H04N 19/172* (2014.11); *H04N 19/423* (2014.11); *H04N 19/61* (2014.11)

(58) Field of Classification Search
CPC .................................................. H04N 19/573
See application file for complete search history.

(56) References Cited

U.S. PATENT DOCUMENTS

| 7,505,518 B2 | 3/2009 | Kadono et al. |
| 8,265,144 B2 | 9/2012 | Christoffersen et al. |
| | (Continued) | |

FOREIGN PATENT DOCUMENTS

| CA | 2793168 C | 9/2016 |
| EP | 2 117 237 A1 | 11/2009 |
| | (Continued) | |

OTHER PUBLICATIONS

Taiwanese Office Action, dated Mar. 7, 2017, pp. 1-15, issued in Taiwanese Patent Application No. 104100275, Taipei, Taiwan.
(Continued)

*Primary Examiner* — James M Pontius
(74) *Attorney, Agent, or Firm* — Brinks Gilson & Lione

(57) ABSTRACT

A moving image encoding/decoding system may include a video predictive encoding device, which may include: an encoding device which encodes each of a plurality of input pictures to generate compressed picture data including a random access picture, and encodes data about display order information of each picture; a restoration device which decodes the compressed picture data to restore a reproduced picture; a picture storage device which stores the reproduced picture as a reference picture; and a memory management device which controls the picture storage device. Following completion of an encoding process of generating the random access picture, the memory management device refreshes the picture storage device by setting every reference picture in the picture storage device, except for the random access picture, as unnecessary immediately before or immediately after encoding a picture with display order information larger than the display order information of the random access picture.

2 Claims, 11 Drawing Sheets

Related U.S. Application Data continuation of application No. 13/618,066, filed on Sep. 14, 2012, now Pat. No. 9,113,171, which is a continuation of application No. PCT/JP2011/055915, filed on Mar. 14, 2011.

(51) Int. Cl.
  *H04N 19/423* (2014.01)
  *H04N 19/61* (2014.01)
  *H04N 19/107* (2014.01)

(56) References Cited

U.S. PATENT DOCUMENTS

| | | |
|---|---|---|
| 9,113,171 B2 | 8/2015 | Boon et al. |
| 9,560,379 B2 | 1/2017 | Song et al. |
| 9,648,325 B2 | 5/2017 | Baeza et al. |
| 9,648,352 B2 | 5/2017 | Baeza et al. |
| 2006/0140271 A1 | 6/2006 | Wedi et al. |
| 2007/0058721 A1 | 3/2007 | Kadono et al. |
| 2007/0171973 A1* | 7/2007 | Kobayashi ............ H04N 5/232 375/240.12 |
| 2009/0232199 A1 | 9/2009 | Kobayashi et al. |
| 2010/0260484 A1* | 10/2010 | Hattori ................. H04N 13/178 386/355 |
| 2011/0064146 A1* | 3/2011 | Chen .............. H04N 21/234327 375/240.26 |
| 2011/0081131 A1* | 4/2011 | Hattori ................. G11B 27/034 386/328 |
| 2012/0230401 A1 | 9/2012 | Chen et al. |
| 2013/0064284 A1* | 3/2013 | Samuelsson ........... H04N 19/70 375/240.01 |
| 2015/0350644 A1 | 12/2015 | Boon et al. |
| 2016/0337657 A1* | 11/2016 | Choi ...................... H04N 19/50 |

FOREIGN PATENT DOCUMENTS

| | | |
|---|---|---|
| JP | 2004-248265 | 9/2004 |
| JP | 2004-260236 | 9/2004 |
| JP | 2006-246277 | 9/2006 |
| JP | 2007-507128 | 3/2007 |
| JP | 2009-296078 A | 12/2009 |
| TW | I479895 B | 4/2015 |
| TW | I479895 B | 4/2015 |
| WO | WO 2005/006763 A1 | 1/2005 |
| WO | WO 2011/115045 A1 | 9/2011 |

OTHER PUBLICATIONS

Japanese Office Action with English translation, dated Jan. 13, 2015, pp. 1-7, issued in Japanese Patent Application No. P2014-015544, Japanese Patent Office, Tokyo, Japan.

Chinese Office Action with English translation, dated Jan. 12, 2015, pp. 1-22, issued in Chinese Patent Application No. 201180013583. 6, State Intellectual Property Office, Beijing, The Peoples' Republic of China.

Extended European Search Report, dated Oct. 22, 2015, pp. 1-10, issued in European Patent Application No. 11756230.6, European Patent Office, Munich, Germany.

Amonou (FT) I et al., "Description of video coding technology proposal by France Telecom, NTT, NTT DOCOMO, Panasonic and Technicolor", Apr. 13, 2010, pp. 1-42, Joint Collaborative Team on Video Coding (JCT-VC) of ITU-T SG16 WP3 and ISO/IEC JTC1/SC29/WG11, 1$^{st}$ Meeting Dresden DE, Apr. 15-23, 2010; Document No. JCTVC-A114, XP030009031.

Amonou (FT) I et al., "Video coding technology proposal by France Telecom, NTT, NTT DoCoMo, Panasonic and Technicolor", "Annex A CDCM Video Codec: Decoder Specification", May 7, 2010, pp. 1-107, Joint Collaborative Team on Video Coding (JCT-VC) of ITU-T SG16 WP3 and ISO/IEC JTC1/SC29/WG11; 1$^{st}$ Meeting Dresden DE, Apr. 15-23, 2010; Document No. JCTVC-A114-Annex A, XP030007553.

Canadian Office Action, dated Jan. 12, 2016, pp. 1-5, issued in Canadian Patent Application Serial No. 2,793,168, Canadian Intellectual Property Office, Gatineau, Quebec, Canada.

Extended European Search Report, dated Feb. 4, 2016, pp. 1-10, issued in European Patent Application No. 15169622.6, European Patent Office, Munich, Germany.

Korean Office Action with English translation, dated Mar. 18, 2016, pp. 1-7, issued in Korean Patent Application No. 10-2012-7027048, Korean Intellectual Property Office, Daejeon, Republic of Korea.

Japanese Office Action with English translation, dated Apr. 12, 2016, pp. 1-7, issued in Japanese Patent Application No. P2015-052342, Japanese Patent Office, Tokyo, Japan.

Taiwan Office Action dated Jul. 12, 2016, pp. 1-8, issued in Taiwan Patent Application No. 104100275, Taiwan Intellectual Property Office, Taipei City, Taiwan.

Korean Office Action with English translation, dated Jul. 26, 2016, pp. 1-7, issued in Korean Patent Application No. 10-2016-7012926, Korean Intellectual Property Office, Daejeon, Republic of Korea.

European Office Action, dated Aug. 8, 2016, pp. 1-5, issued in European Patent Application No. 11756230.6, European Patent Office, Rijswijk, The Netherlands.

European Office Action, dated Nov. 25, 2016, pp. 1-4, issued in European Patent Application No. 15 169 622.6, European Patent Office, Rijswijk, The Netherlands.

Wiegand et al., JVT-5201, "Joint Draft 6," Joint Video Team (JVT) of ISO/IEC MPEG & ITU-T VCEG (ISO/IEC JTC1/SC29/WG11 and ITU-T SG16 Q. 6), pp. 1-19, 19$^{th}$ Meeting: Apr. 1-7, 2006, Geneva, Switzerland.

Taiwanese Office Action, dated Mar. 28, 2017, pp. 1-15, issued in Taiwanese Patent Application No. 104100275, Taipei, Taiwan.

Canadian Office Action, dated Apr. 28, 2017, pp. 1-4, issued in Canadian Patent Application No. 2,935,201, Canadian Intellectual Property Office, Gatineau, Quebec, Canada.

India Office Action, dated Jul. 13, 2018, pp. 1-6, issued in India Patent Application No. 8620/CHENP/2012, Intellectual Property India, Chennai, India.

Canada Examination Report, dated Apr. 15, 2019, pp. 1-12, issued in Canadian Patent Application No. 3,009,965, Canadian Intellectual Property Office, Gatineau, Quebec, Canada.

* cited by examiner

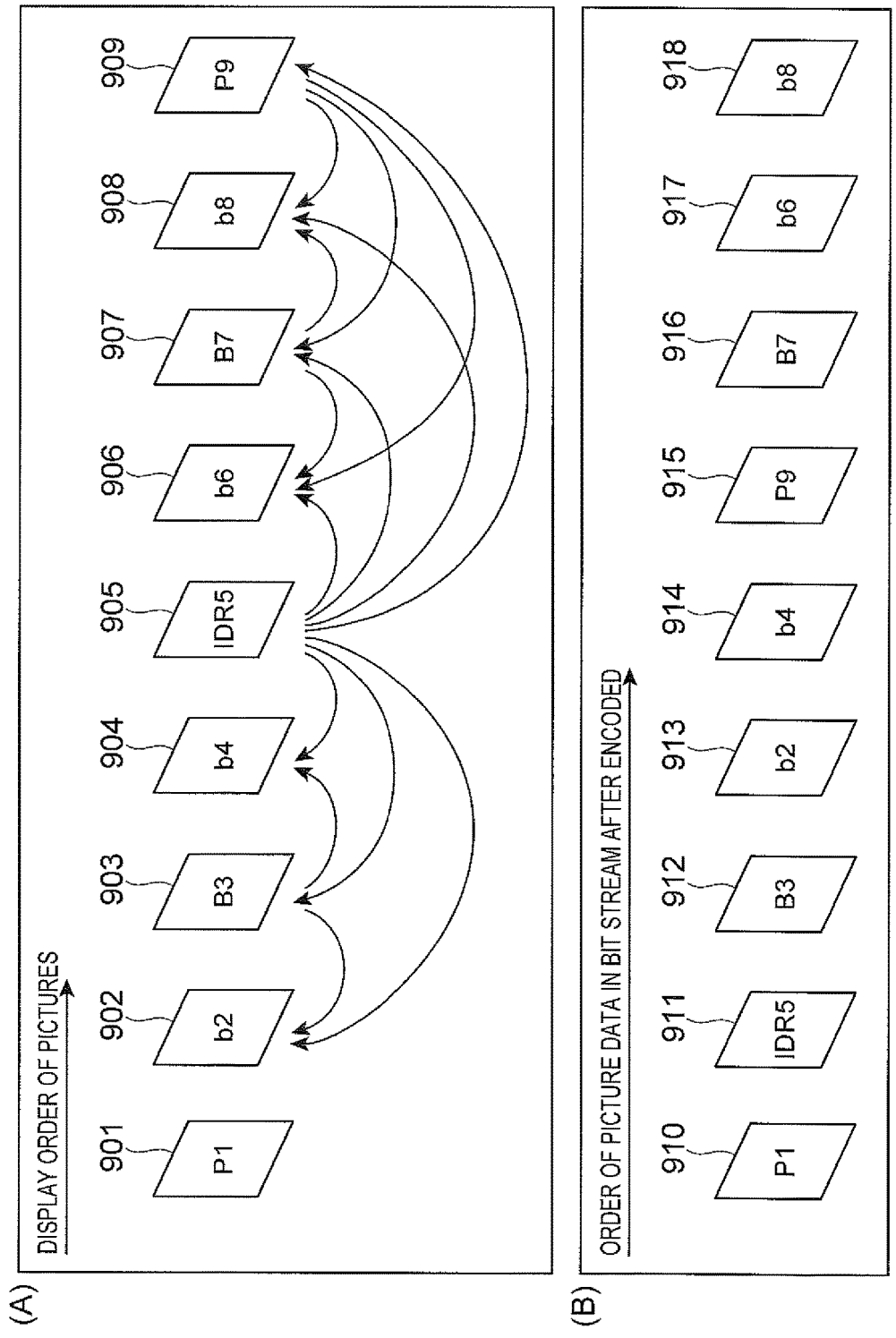

MOVING IMAGE PREDICTION ENCODING/DECODING SYSTEM

PRIORITY CLAIM

This application is a continuation of U.S. patent application Ser. No. 14/822,657 filed Aug. 10, 2015, which is a continuation of U.S. patent application Ser. No. 13/618,066 filed Sep. 14, 2012, which is a continuation of PCT Patent Application No. PCT/JP2011/055915, filed Mar. 14, 2011, which claims the benefit of priority of Japanese Patent Application No. 2010-061337, filed Mar. 17, 2010, all of which are incorporated by reference.

TECHNICAL FIELD

The present invention relates to moving image prediction encoding/decoding system that may include either or both of a video predictive encoding system and a video predictive decoding system.

BACKGROUND ART

Compression encoding technologies are used for efficient transmission and storage of video data. The systems of MPEG1 to MPEG4 and H.261 to H.264 are widely used for videos. In these encoding systems, a picture as an encoding target is divided into a plurality of blocks and each block is subjected to an encoding/decoding process. Predictive encoding methods are used for enhancement of encoding efficiency.

SUMMARY

A moving image prediction encoding/decoding system includes an encoding system and a decoding system. The moving image prediction encoding/decoding system may achieve efficient compression encoding of pictures before and after a picture at a random access point.

The encoding system may operate as a video predictive encoding device that includes input means, which accepts input of a plurality of pictures constituting a video sequence; encoding means which encodes each of the input pictures by a method of either intra-frame prediction or inter-frame prediction to generate compressed picture data including a random access picture serving as a picture of random access, and which encodes data about display order information of each of the pictures; restoration means which decodes the compressed picture data thus generated, to restore a reproduced picture; picture storage means which stores the reproduced picture thus restored, as a reference picture to be used for encoding of a subsequent picture; and memory management means which controls the picture storage means, wherein following completion of an encoding process to generate the random access picture, the memory management means refreshes the picture storage means by setting every reference picture stored in the picture storage means except for the random access picture as unnecessary immediately before or immediately after first encoding a picture with display order information larger than the display order information of the random access picture.

When encoding the display order information of the at least one encoding target that includes a picture which has display order information larger than the display order information of the random access picture and becomes the first encoding target after completion of the encoding process of generating the random access picture, the encoding means may encode a difference value between the display order information of at least one encoding target and the display order information of the random access picture.

When encoding the display order information of each picture in a sequence from a picture that becomes the next encoding target after the random access picture, to a picture having display order information larger than the display order information of the random access picture and that becomes the first encoding target after completion of the encoding process of generating the random access picture, the encoding means may encode a difference value between the display order information of each picture and the display order information of the random access picture.

A video predictive decoding device according to an example embodiment is a video predictive decoding device comprising: input means which accepts input of compressed picture data including a random access picture serving as a picture of random access, which was obtained by encoding each of a plurality of pictures constituting a video sequence by a method of either intra-frame prediction or inter-frame prediction, and display order encoded data obtained by encoding data providing display order information of each of the pictures; restoration means which decodes the compressed picture data to restore a reproduced picture and which decodes the display order encoded data to restore the display order information thereof; picture storage means which stores the reproduced picture thus restored, as a reference picture to be used for decoding of a subsequent picture; and memory management means which controls the picture storage means, wherein after completion of a decoding process of decoding the random access picture the memory management means refreshes the picture storage means by setting every reference picture stored in the picture storage means except for the decoded random access picture as unnecessary immediately before or immediately after first decoding a picture having display order information larger than the display order information of the random access picture.

When decoding display order information of at least one decoding target picture which has display order information larger than the display order information of the random access picture and which becomes the first decoding target following completion of the decoding process of decoding the random access picture, the restoration means may restore the display order information of the decoding target picture by adding a difference value to the display order information of the random access picture. The difference value may represent a difference between the display order information of the decoding target picture and the display order information of the random access picture. The display order information of the decoding target picture may be obtained by decoding the display order encoded date of the decoding target picture.

When decoding display order information of each picture in a sequence from a picture which becomes a next decoding target after the random access picture, to a picture having display order information larger than the display order information of the random access picture, and which becomes the first decoding target after completion of a decoding process of generating the random access picture, the restoration means may restore the display order information of each picture by adding a difference value to the display order information of the random access picture. The difference value may represent a difference between the display order information of each picture and the display order information of the random access picture. The display order information of each picture may be obtained by decoding the display order encoded data of each picture.

A video predictive encoding method according to an example embodiment is a video predictive encoding method to be executed by a video predictive encoding device with picture storage means for storing a reference picture to be used for encoding of a subsequent picture, comprising: an input step of accepting input of a plurality of pictures constituting a video sequence; an encoding step of encoding each of the input pictures by a method of either intra-frame prediction or inter-frame prediction to generate compressed picture data including a random access picture serving as a picture of random access, and encoding data about display order information of each of the pictures; a restoration step of decoding the compressed picture data thus generated, to restore a reproduced picture; a picture storage step of storing the reproduced picture thus restored, as a reference picture to be used for encoding of a subsequent picture; and a memory management step of controlling the picture storage means, wherein, following completion of an encoding process of generating the random access picture, in the memory management step, the video predictive encoding device refreshes the picture storage means by setting every reference picture stored in the picture storage means, except for the random access picture, as unnecessary, immediately before or immediately after encoding a picture having display order information larger than the display order information of the random access picture.

In the encoding step, the video predictive encoding device may encode a difference value. The difference value may be encoded as data providing display order information of at least one encoding target picture. The at least one encoding target picture may have display order information larger than the display order information of the random access picture and may become the first encoding target picture following completion of the encoding process of generating the random access picture. The difference value may represent a difference between the display order information of the encoding target picture and the display order information of the random access picture.

In the encoding step, when encoding each picture in a sequence from a picture which becomes a next encoding target after the random access picture, to a picture which has display order information larger than the display order information of the random access picture, and becoming the first encoding target after completion of the encoding process of generating the random access picture, the video predictive encoding device may encode a difference value. The difference value may be encoded as data providing display order information of each picture. The difference value may represent a difference between the display order information of each picture and the display order information of the random access picture.

A video predictive decoding method according to an example embodiment is a video predictive decoding method to be executed by a video predictive decoding device with picture storage means for storing a reference picture to be used for decoding of a subsequent picture, comprising: an input step of accepting input of compressed picture data including a random access picture serving as a picture of random access, which was obtained by encoding each of a plurality of pictures constituting a video sequence by a method of either intra-frame prediction or inter-frame prediction, and display order encoded data obtained by encoding data about display order information of each of the pictures; a restoration step of decoding the compressed picture data to restore a reproduced picture and decoding the display order encoded data to restore the display order information thereof; a picture storage step of storing the reproduced picture thus restored, as a reference picture to be used for decoding of a subsequent picture, into the picture storage means; and a memory management step of controlling the picture storage means, wherein, after completion of a decoding process of decoding the random access picture, in the memory management step, the video predictive decoding device refreshes the picture storage means by setting every reference picture stored in the picture storage means except for the random access picture as unnecessary, immediately before or immediately after decoding a picture which has display order information larger than the display order information of the random access picture.

In the restoration step, for display order information of at least one decoding target including a picture which has display order information larger than the display order information of the random access picture and which becomes the first decoding target after completion of the decoding process of decoding the random access picture, the video predictive decoding device may restore the display order information of the decoding target picture by adding a difference value to the display order information of the random access picture. The difference value may represent a difference between the display order information of the decoding target picture and the display order information of the random access picture. The display order information of the decoding target picture may be obtained by decoding the display order encoded data of the decoding target picture.

In the restoration step, when encoding the display order information of each picture in a sequence from a picture which becomes a next decoding target after the random access picture, to a picture having display order information larger than the display order information of the random access picture and which becomes the first decoding target after completion of a decoding process of generating the random access picture, the video predictive decoding device may restore the display order information of each picture by adding a difference value to the display order information of the random access picture. The difference value may represent a difference between the display order information of each picture and the display order information of the random access picture. The display order information of each picture may be obtained by decoding the display order encoded data of each picture.

A video predictive encoding program according to an example embodiment is a video predictive encoding program for letting a computer operate as: input means which accepts input of a plurality of pictures constituting a video sequence; encoding means which encodes each of the input pictures by a method of either intra-frame prediction or inter-frame prediction to generate compressed picture data including a random access picture serving as a picture of random access, and which encodes data about display order information of each of the pictures; restoration means which decodes the compressed picture data thus generated, to restore a reproduced picture; picture storage means which stores the reproduced picture thus restored, as a reference picture to be used for encoding of a subsequent picture; and memory management means which controls the picture storage means, wherein after completion of an encoding process of generating the random access picture, the memory management means refreshes the picture storage means by setting every reference picture stored in the picture storage means except for the random access picture as unnecessary, immediately before or immediately after encoding a picture with display order information larger than the display order information of the random access picture.

A video predictive decoding program according to an example embodiment is a video predictive decoding program for letting a computer operate as: input means which accepts input of compressed picture data including a random access picture serving as a picture of random access, which was obtained by encoding each of a plurality of pictures constituting a video sequence, by a method of either intra-frame prediction or inter-frame prediction, and display order encoded data obtained by encoding data about display order information of each of the pictures; restoration means which decodes the compressed picture data to restore a reproduced picture and which decodes the display order encoded data to restore the display order information thereof; picture storage means which stores the reproduced picture thus restored, as a reference picture to be used for decoding of a subsequent picture; and memory management means which controls the picture storage means, wherein after completion of a decoding process of decoding the random access picture, the memory management means refreshes the picture storage means by setting every reference picture stored in the picture storage means except for the random access picture as unnecessary, immediately before or immediately after decoding a picture with display order information larger than the display order information of the random access picture.

The system as described above achieves efficient compression encoding of pictures before and after a picture that is a random access point and, at the same time, resolves the inconveniences associated with the defects of conventional technology.

The moving image encoding/decoding system uses the information indicative of the display order attendant on each respective picture forming a video sequence or compression-encoded picture data (which will be referred to hereinafter as "display order information" (corresponding to the display time, temporal reference information, temporal reference, or the like, in the conventional technology)) to set the timing of memory refreshment. The memory refreshment may be carried out following an intra-frame predicted picture (intra frame) at a random access point to achieve efficient compression encoding of pictures before and after the random access picture in the display order and, at the same time, resolve the inconveniences associated with the defects of the conventional technology as described below.

Specifically, the display order information is attendant on each picture and therefore there is no need for transmission of new information such as a flag.

When a video sequence is edited (such as to discard some pictures, or to join other pictures), the display order information of each picture forming the video sequence can be appropriately set, so as to cause no malfunction.

Furthermore, the timing of memory refreshment by the moving image encoding/decoding system is not limited to P pictures and is independent of the encoding types of pictures (I pictures, P pictures, or B pictures), and therefore the processing can be performed in an encoding type with the best encoding efficiency, independent of the necessity of refreshment of the memory.

BRIEF DESCRIPTION OF DRAWINGS

FIG. 11 is a schematic view showing a prediction structure of an example video predictive encoding/decoding method.

DESCRIPTION OF EMBODIMENTS

Figure 1:
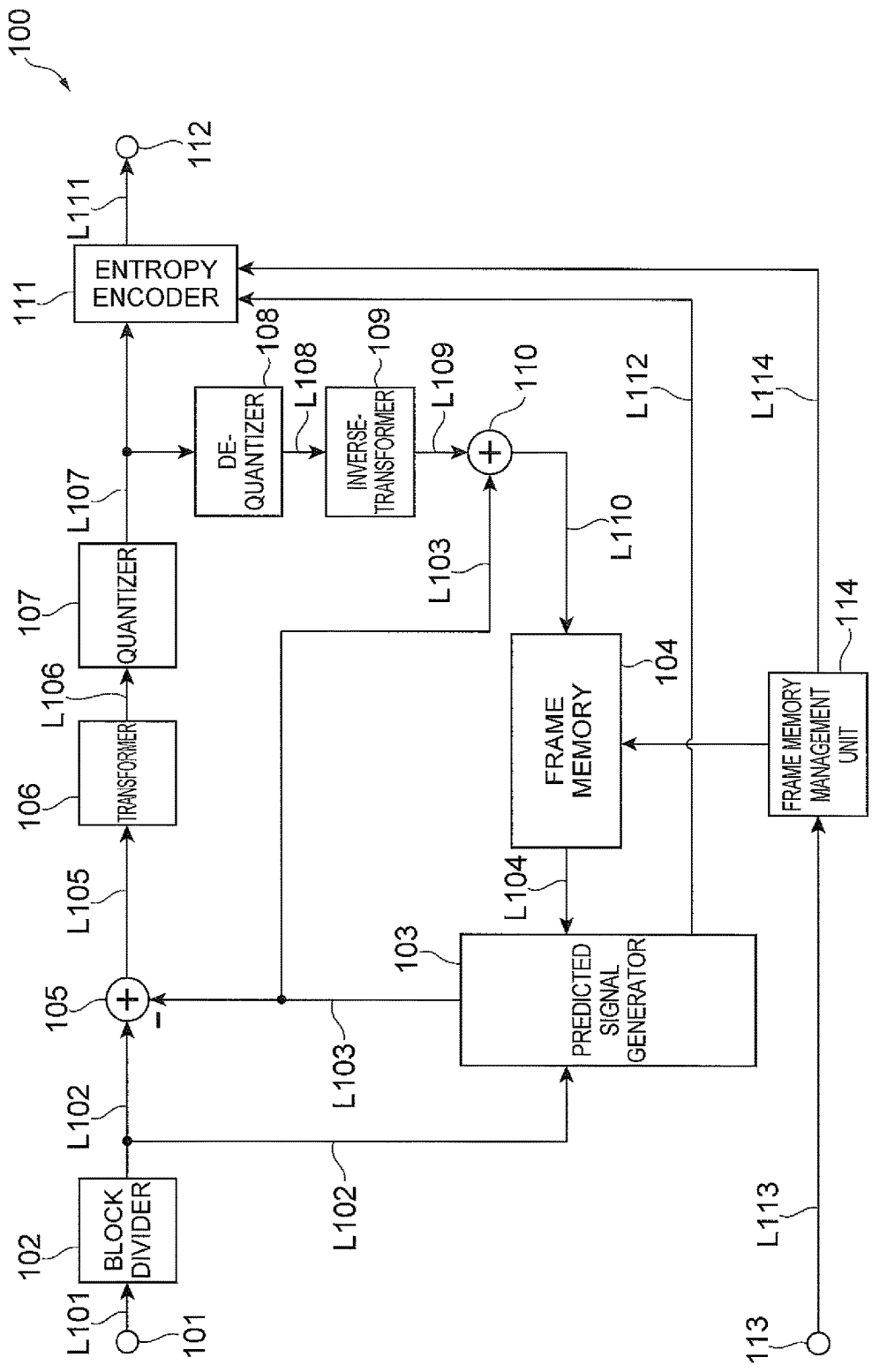
FIG. 1 is a functional block diagram showing an example configuration of a video predictive encoding device.

In intra-frame predictive encoding, a predicted signal is encoded. The predicted signal can be generated using a neighboring previously-reproduced image signal (restored image signal from image data previously encoded) in the same frame as a target block and a difference signal obtained by subtracting the predicted signal from a signal of the target block. In inter-frame predictive encoding, a search for a displacement signal is performed with reference to a previously-reproduced image signal in a frame different from a target block. A predicted signal is generated with compensation for the displacement signal identified in the search, and a difference signal obtained by subtracting the predicted signal from the signal of the target block is encoded. The previously-reproduced image signal used as the reference for the motion search and compensation can be called a reference picture.

In bidirectional inter-frame prediction, reference can be made not only to past pictures that are to be displayed prior to a target picture in the display time order, but also future pictures to be displayed after the target picture (provided that the future pictures need to be encoded prior to the target picture and are preliminarily reproduced). Then a predicted signal acquired from a past picture and a predicted signal acquired from a future picture can be averaged, which provides the benefits of allowing effective prediction for a signal of a newly-appearing object, and reducing noise included in the two predicted signals.

Furthermore, in inter-frame predictive encoding, such as using H.264, a predicted signal for a target block can be produced with reference to a plurality of reference pictures previously encoded and reproduced, and a picture signal with the smallest error can be selected as an optimum predicted signal by motion search. Then a difference can be calculated between a pixel signal of the target block and this optimum predicted signal, and the difference can be subject to discrete cosine transform, quantization, and entropy encoding.

At the same time, a piece of information of a reference picture from which the optimum predicted signal for the target block is acquired (reference index) and a piece of information of a region in the reference picture from which the optimum predicted signal is acquired (motion vector) can be encoded together. In inter-frame predictive encoding, such as using H.264, four or five reproduced pictures can be stored as reference pictures in a frame memory. The frame memory, as described herein, can include a reproduced picture buffer (decoded picture buffer).

The inter-frame predictive encoding allows efficient compression encoding by taking advantage of correlation between pictures, but dependence between frames is eliminated, in order to allow viewing from anywhere in the middle of a video program, such as what can occur when a viewer is switching TV channels. A point without dependence between frames in a compressed bitstream of a video sequence will be referred to hereinafter as a "random access point." Besides the switching of TV channels, the random access points are also needed in cases of editing a video sequence and joining compressed data of different video sequences. In inter-frame predictive encoding, such as using H.264, IDR pictures can be designated, the designated instantaneous decoding refresh (IDR) pictures can be encoded by the intra-frame predictive encoding method, and at the same time, reproduced pictures stored in the frame memory are set as unnecessary, so that the reproduced pictures are not used for reference pictures, thereby substantially clearing the frame memory (or refreshing the frame memory). This process is hereinafter referred to as "memory refresh" and can also be called "frame memory refresh" or "buffer refresh" in some cases.

FIG. 11 (A) is a schematic diagram showing an example prediction structure of a motion video including an IDR picture. A plurality of pictures 901, 902, . . . , 909 shown in FIG. 11 (A) are part of a series of images constituting a video sequence. Each image is also called a "picture" or "frame." Each arrow indicates a direction of prediction. For example, for the picture 902, a predicted signal is acquired using pictures 903, 905 as reference pictures as indicated by the starting points of two arrows directed to the picture 902. The picture 901 in FIG. 11 (A) is assumed to be encoded with reference to past pictures not shown in FIG. 11 (A).

Next, the pictures 902, 903, and 904 are encoded using the bidirectional predictive encoding in order to increase compression rates. Specifically, the picture 905 is first encoded and reproduced and then the picture 903 is encoded with reference to the previously-reproduced pictures 901 and 905 (an arrow from the picture 901 is omitted in FIG. 11 (A)). Thereafter, each of pictures 902 and 904 are encoded using the three reproduced pictures 901, 905, and 903 as reference pictures (an arrow from the picture 901 is omitted in FIG. 11 (A)). Likewise, pictures 906, 907, and 908 are encoded with reference to pictures 905 and 909.

The compressed data of the pictures that are encoded (or compressed) in this manner is transmitted or stored in the order as described in FIG. 11 (B). The correspondence or relationship between the compressed data in FIG. 11 (B) and the pictures in FIG. 11 (A) is indicated by common identifiers such as P1, IDR5, and B3. For example, compressed data 910 is compressed data of picture 901 denoted by the same identifier "P1," and compressed data 911 is compressed data of picture 905 denoted by the same identifier "IDR5."

Now, with consideration to random access, let us consider a case where the intra-frame predictive coding is carried out while designating the picture 905 as an IDR picture. In this case, for example, immediately after reproduction of the picture 905 by decoding of compressed data 911 (or possibly immediately before the start of decoding of compressed data 911), all the reference pictures stored in the frame memory (i.e., the past reproduced pictures including the picture 901) are set as unnecessary so they are not used as reference pictures. As a result, the picture 901 in FIG. 11 (A) is not available as a reference picture, and becomes unavailable for encoding of pictures 902, 903, and 904.

Since the introduction of IDR pictures can lead to elimination of reference pictures otherwise available for use in prediction, efficient encoding of pictures before an IDR picture is identified in the display order of pictures (the pictures 902, 903, and 904 in the example of FIG. 11 (A)). To avoid this scenario, the timing of refreshment of the frame memory (i.e., the timing of setting the reference pictures in the frame memory as unnecessary) can be delayed until execution of encoding of a picture occurs, which can be encoded following designation of the IDR picture. When the timing of refreshment of the frame memory is delayed, the picture 901 remains in the frame memory at the time of execution of encoding the pictures 902, 903, and 904 in FIG. 11 (A), and therefore reference to the picture 901 is available when encoding the pictures 902, 903, and 904, in order to allow efficient encoding.

The timing of the memory refreshment can be achieved by a number of methods, such as by a first method of adding information about the number of pictures to be delayed, to each IDR picture. In a second example method, compressed data can be added to each picture as a signal, such as a flag, that instructs execution of memory refreshment, where the signal corresponds to the timing of execution of memory refreshment. In a third example method, a P picture (unidirectional predicted picture) first appearing after each IDR picture can be defined as timing of refreshment.

However, the above methods have the following shortcomings. In method 1 there is inconvenience created by editing of a video sequence, such as when some pictures out of a plurality of pictures are discarded and other pictures are joined or inserted, so as to make inappropriate the "information about the number of pictures to be delayed" that is added to each IDR picture. In method 2, similar to the previous example, with use of the flag, if compressed data of a corresponding picture is deleted by editing of the video sequence, the flag added to the deleted compressed data is missed. In method 3, since the sign (trigger) of memory refreshment is limited to the P pictures, encoding by other methods becomes unavailable. For example, a picture at a change of scene cannot be encoded by intra-frame prediction (I picture). Due to these shortcomings in the example methods, the timing of execution of memory refreshment can create a state in which there is no reference picture available for decoding of subsequent data in the frame memory and, as a consequence, reproduction of a subsequent picture can be challenging.

Video Predictive Encoding Device

FIG. 1 is a functional block diagram showing a configuration of a moving image prediction encoding system in the form of a video predictive encoding device 100 according to an example embodiment. As shown in FIG. 1, the video predictive encoding device 100 is provided with functional components of input terminal unit 101, block divider unit 102, predicted signal generator unit 103, frame memory unit 104, subtracter unit 105, transformer unit 106, quantizer unit 107, de-quantizer unit 108, inverse-transformer unit 109, adder unit 110, entropy encoder unit 111, output terminal unit 112, input terminal unit 113, and frame memory management unit 114. Operation of the respective functional components will be described in the below-described operation of the video predictive encoding device 100. The term "module" or "unit" or "component" is defined to include one or a plurality of executable modules or units or components. As described herein, the modules or units or components are defined to include software, hardware or some combination thereof executable by a processor. Software modules may include instructions stored in memory that are executable by the processor, Hardware modules may include various devices, components, circuits, gates, circuit boards, and the like that are executable, directed, and/or controlled for performance by the processor.

Example operation of the video predictive encoding device 100 will be described below. A video signal of a video sequence consisting of a plurality of pictures as targets for an encoding process is fed into the input terminal 101 and the block divider 102 divides each picture into a plurality of regions. In the present embodiment, each picture is divided into a plurality of blocks each consisting of 8×8 pixels, but it may be divided into blocks of any block size or shape other than the foregoing. Next, for a target of a block as an object to be encoded (which will be referred to hereinafter as "target block"), a predicted signal is generated by a below-described prediction method. In the present embodiment, available prediction methods are two types of prediction methods, inter-frame prediction and intra-frame prediction, and the bidirectional inter-frame prediction described in the background art is also applicable to the inter-frame prediction. The respective fundamental operations of the inter-frame prediction and the intra-frame prediction will be summarized below.

In inter-frame prediction, a reproduced picture having been previously encoded and then restored is used as a reference picture and motion information (e.g., a motion vector) is obtained from the reference picture to provide a predicted signal with the smallest error for the target block. This process is called "motion detection." In some cases, the target block may be subdivided into small regions and the inter-frame prediction method may be determined for a target of each subdivided small region. In such cases, the most efficient division method is determined among a variety of division methods. The determined division method is used to subdivide the target block into small regions and motion information of each small region for the entire target block are determined. In the present embodiment, the inter-frame prediction is carried out by the predicted signal generator 103. The target block is fed through line L102 to the predicted signal generator 103, while the reference picture is fed through line L104 to the predicted signal generator 103. Concerning the reference picture, a plurality of pictures having been previously encoded and then restored can be used as reference pictures. Examples of uses of restored reference pictures are included in any one of the methods of MPEG-2, MPEG-4, and H.264, which are conventional technologies. The determined division method information used to determine the small regions, and motion information of each small region is sent from the predicted signal generator 103 through line L112 to the entropy encoder 111. The entropy encoder 111 encodes the determined division method motion information and the motion information of each small region, and the encoded data is sent through line L111 out of output terminal 112. Information indicating from which reference picture the predicted signal is acquired out of the plurality of reference pictures (reference index) is also sent from the predicted signal generator 103 through line L112 to the entropy encoder 111.

The reference picture indication information is encoded by the entropy encoder 111, and then the encoded data is sent through line L111 out of the output terminal 112. In the present embodiment, as an example, four or five reproduced pictures are stored in the frame memory 104 (or picture storage medium), and are used as reference pictures. The predicted signal generator 103 acquires a reference picture from the frame memory 104, based on the small-region division method, and the reference picture and motion information for each small region, and generates a predicted signal from the reference picture and motion information (which is called "inter-frame predicted signal" in the sense that it is a predicted signal obtained by inter-frame prediction). The inter-frame predicted signal generated in this manner is sent through line L103 to the subtracter 105 and to the adder 110 for below-described processing.

On the other hand, the intra-frame prediction is to generate an intra-frame predicted signal, using previously-reproduced pixel values spatially adjacent to a target block. Specifically, the predicted signal generator 103 acquires previously-reproduced pixel signals in the same frame from the frame memory 104 and generates a predicted signal by extrapolation of the previously-reproduced pixel signals (which is called "intra-frame predicted signal" in the sense that it is a predicted signal obtained by intra-frame prediction). The intra-frame predicted signal thus generated is sent from the predicted signal generator 103 through line L103 to the subtracter 105. The method of generating the intra-frame predicted signal in the predicted signal generator 103 can be, for example, similar to the method of H.264. The information indicating the extrapolation method in the intra-frame prediction is sent from the predicted signal generator 103 through line L112 to the entropy encoder 111, where it is encoded by the entropy encoder 111, and the encoded data is sent out of the output terminal 112.

The above summarized an example of respective operations of the inter-frame prediction and the intra-frame prediction. In practice, for each target block, a predicted signal with the smallest error is selected from the inter-frame and intra-frame predicted signals obtained as described above, and is sent from the predicted signal generator 103 through line L103 to the subtracter 105.

Incidentally, since there is no previous picture for the first picture to be encoded, all the target blocks in the first picture are processed by the intra-frame prediction. In preparation for switching of TV channels, all target blocks in a certain picture are periodically processed as a random access point, by the intra-frame prediction. Such pictures can be called intra frames.

The subtracter 105 subtracts the predicted signal received through line L103, from the signal of the target block received through line L102, to generate a residual signal. This residual signal is transformed by discrete cosine transform by the transformer 106 and each of the transform coefficients are quantized by the quantizer 107. Finally, the quantized transform coefficients are encoded by the entropy encoder 111 and the resultant encoded data is sent along with the information about the prediction method through line L111 out of the output terminal 112.

On the other hand, for the intra-frame prediction or the inter-frame prediction for a subsequent target block, the quantized transform coefficients (encoded data of the target block) are de-quantized by the de-quantizer 108 and thereafter the transform coefficients are inversely transformed by inverse discrete cosine transform by the inverse-transformer 109, thereby restoring the residual signal. Then the adder 110 adds the restored residual signal to the predicted signal sent through the line L103, to reproduce the signal of the target block, and the reproduced signal thus obtained is stored into the frame memory 104. The present embodiment employs the transformer 106 and the inverse-transformer 109, but any other transform process may be employed instead of these. Furthermore, the transformer 106 and the inverse-transformer 109 may be omitted in some cases.

Incidentally, the capacity of the frame memory 104 is limited and it is actually impossible to store all reproduced pictures. For this reason, only reproduced pictures used for encoding of a subsequent picture are stored in the frame memory 104. A unit to control the frame memory 104 is the frame memory management unit 114. The frame memory management unit 114 controls the frame memory 104 in such a manner that the oldest reproduced picture is deleted out of N (e.g., N=4) reproduced pictures stored in the frame memory 104, to allow the most recent reproduced picture used as a reference picture, to be stored in the frame memory 104. In fact, the frame memory management unit 114 receives input of display order information of each picture and type information for encoding of each picture (intra-frame predictive encoding, inter-frame predictive encoding, or bidirectional predictive encoding) from the input terminal 113, and the frame memory management unit 114 operates based on these pieces of information. At this time, the display order information of each picture is sent from the frame memory management unit 114 through line L114 to the entropy encoder 111, where it is encoded by the entropy encoder 111. The display order information thus encoded is sent together with the encoded picture data through line L111 out of the output terminal 112. The display order information is information that is attendant on each picture, and may be information indicative of an order of the picture, or information indicative of a time of display of the picture (e.g., a display reference time of the picture (temporal reference)). In the present embodiment, for example, the display order information itself is encoded by binary encoding. The control method by the frame memory management unit 114 will be described later.

Video Predictive Decoding Device

Figure 2:
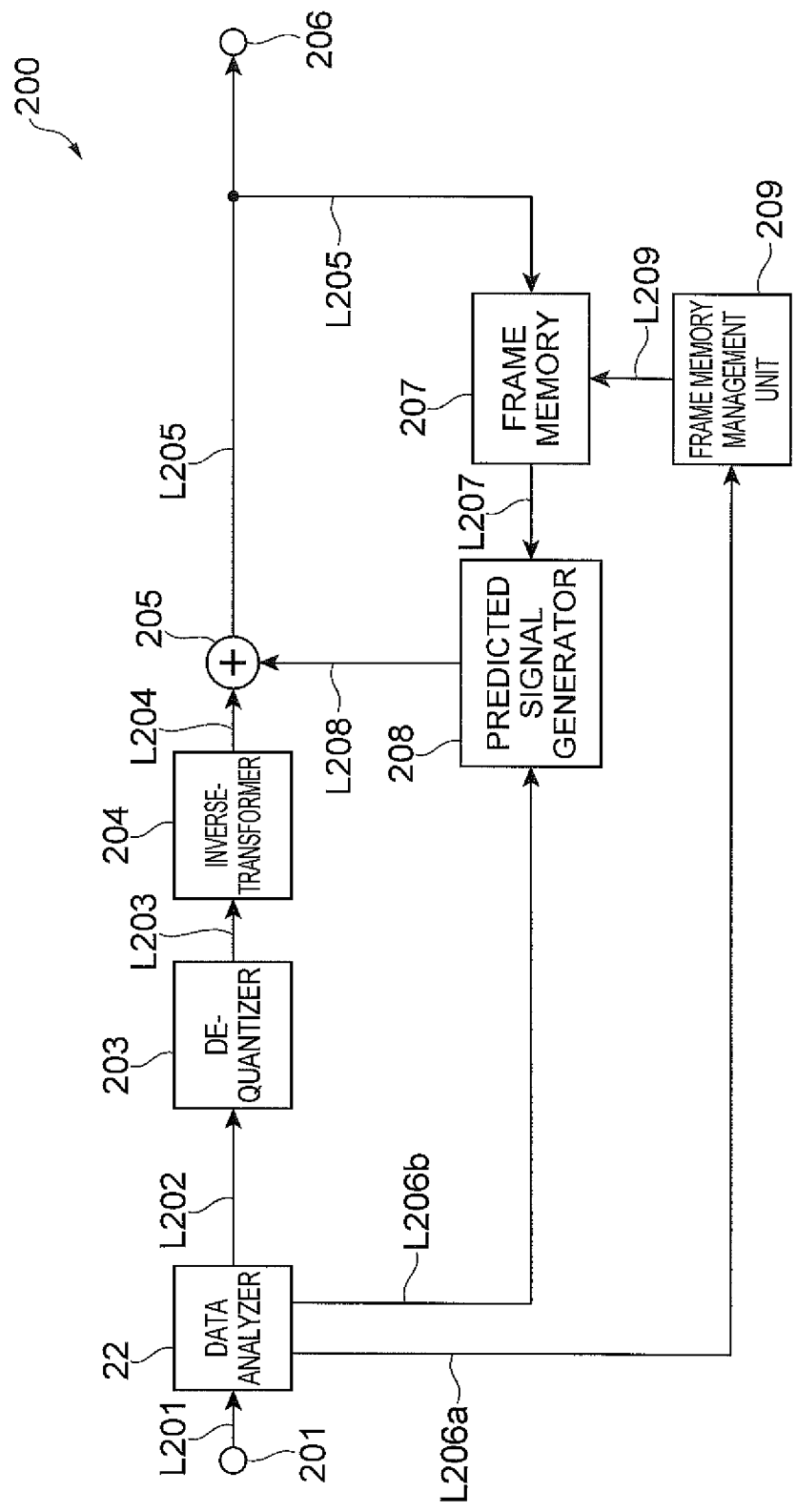
FIG. 2 is a functional block diagram showing an example configuration of a video predictive decoding device.

Next, the video predictive decoding system, such as a video predictive decoding device will be described. FIG. 2 is a functional block diagram showing an example configuration of video predictive decoding device 200 according to an example embodiment. As shown in FIG. 2, the video predictive decoding device 200 is provided with functional components of input terminal 201, data analyzer unit 202, de-quantizer unit 203, inverse-transformer unit 204, adder unit 205, predicted signal generator unit 208, frame memory unit 207, output terminal unit 206, and frame memory management unit 209. Operations of the respective functional component will be described in operation of the video predictive decoding device 200 described below. The means associated with decoding does not always have to be limited to the de-quantizer 203 and inverse-transformer 204. In other embodiments, any means other than these may be employed. In some example embodiments, the means associated with decoding may be composed of only the de-quantizer 203, without the inverse-transformer 204.

The operation of the video predictive decoding device 200 will be described below. The compressed data obtained by the aforementioned encoding method is fed through the input terminal 201. This compressed data contains the residual signal of the target block, the prediction signal generation information describing generation of the predicted signal, the quantization parameter, the display order information of the picture, and the encoding type information indicating the encoding type of the picture. Among these, the prediction signal generation information, for example in the case of the inter-frame prediction, contains the information about block division (the small-region division method information (e.g., the size of block or the like)), the motion information of each small region, and the reference index. In the case of the intra-frame prediction, the prediction signal generation information contains the information about the extrapolation method.

The data analyzer 202 extracts the residual signal of the target block, the prediction signal generation information associated with the generation of the predicted signal, the quantization parameter, the display order information of the picture, and the encoding type information indicating the encoding type of the picture from the input compressed data. Among these, the residual signal of the target block and the quantization parameter are fed through line L202 to the de-quantizer 203, the de-quantizer 203 de-quantizes the residual signal of the target block on the basis of the quantization parameter, and the inverse-transformer 204 inversely transforms the result of the de-quantization by inverse discrete cosine transform. The residual signal restored in this manner is sent through line L204 to the adder 205.

On the other hand, the extracted prediction signal generation information describing the generation of the pre-dicted signal is sent through line L206b to the predicted signal generator 208. The predicted signal generator 208 acquires an appropriate reference picture out of a plurality of reference pictures stored in the frame memory 207 (or picture storage medium), based on the prediction signal generation information describing the generation of the predicted signal, and generates a predicted signal on the basis of the appropriate reference picture. The predicted signal thus generated is sent through line L208 to the adder 205, and the adder 205 adds the predicted signal to the restored residual signal, so as to reproduce the signal of the target block. The signal of the target block thus reproduced is output through line L205 from the output terminal 206 and, at the same time, it is stored as a reproduced picture into the frame memory 207.

Reproduced pictures used for decoding or reproduction of a subsequent picture are stored in the frame memory 207. The frame memory management unit 209 controls the frame memory 207 in such a manner that the oldest reproduced picture is deleted out of N (which is N=4 as an example herein, but may be any predetermined integer). The oldest reproduced picture stored in the frame memory 207 is deleted to allow the most recent reproduced picture used as a reference picture, to be stored into the frame memory 207. The frame memory management unit 209 operates based on the display order information of the target picture and the information about the encoding type of the picture, which are fed through line L206a. The control method by the frame memory management unit 209 will be described later.

An intra frame (intra-frame predicted picture) can serve as a random access point. An IDR picture (instantaneous decoder refresh), such as those included in H.264, may also be referred to as an intra-frame predicted picture. This name originates from the fact that the frame memory (decoder buffer) is refreshed instantaneously after encoding or decoding of an IDR picture. In contrast, the presently described embodiments execute refreshment of the frame memory after a temporary standby (or delay), instead of executing the refreshment of the frame memory immediately after encoding or decoding of an intra frame as a random access point (or immediately before the encoding or the decoding). Thus, in the presently described embodiments this picture is called a DDR picture (deferred decoder refresh or delayed decoder refresh). As described below in detail, the timing of refreshment of the frame memory is determined based on comparison between the display order information of a DDR picture and the display order information of a picture as a target for processing (encoding or decoding) (which will be referred to hereinafter as "processing target picture").

Figure 3:
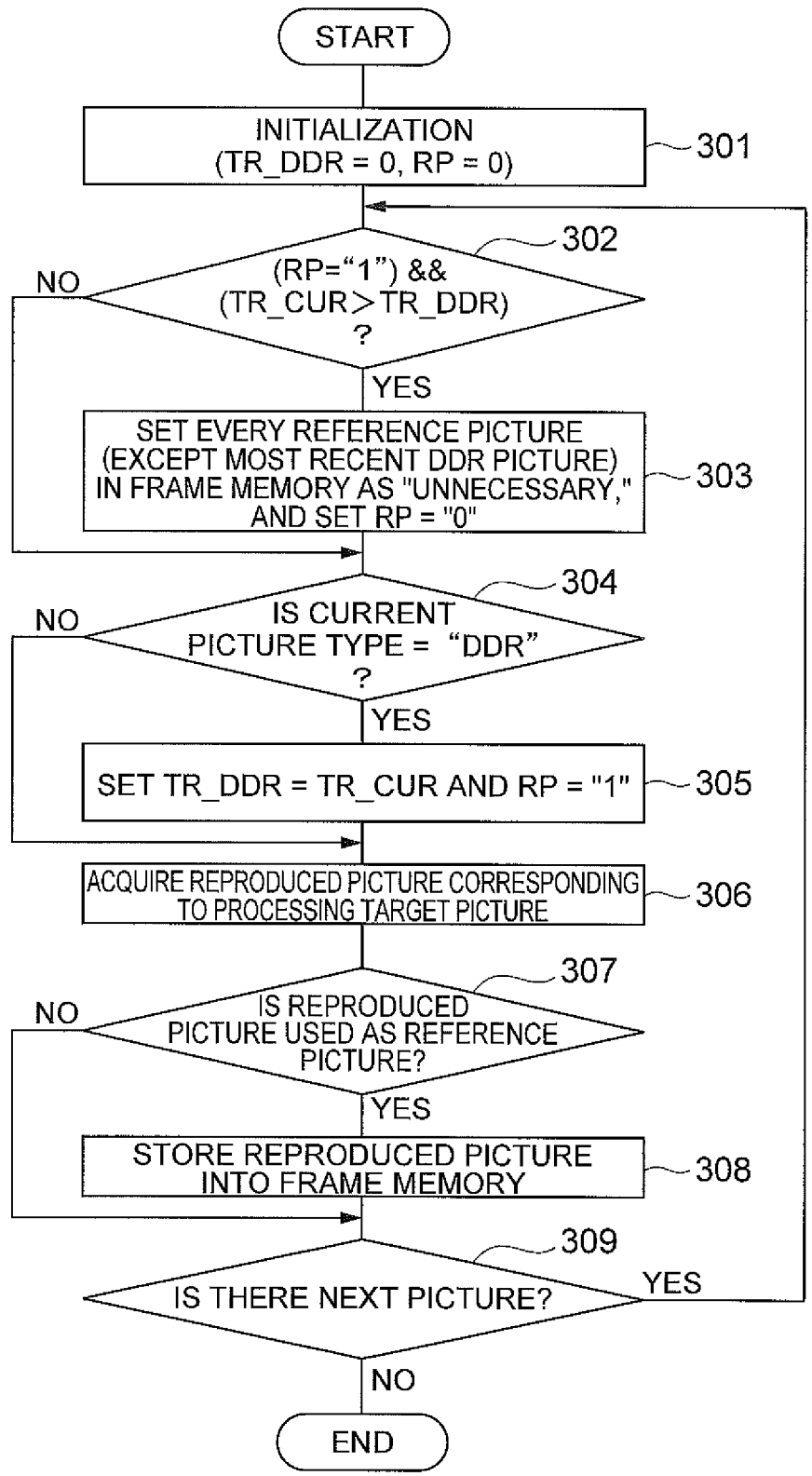
FIG. 3 is an example operational flowchart showing a video predictive encoding/decoding method according to an embodiment.

Characteristic Processing Operations of Video Predictive Encoding Method and Video Predictive Decoding Method The operations of the video predictive encoding method and the video predictive decoding method according to the moving image prediction encoding/decoding system will be described below with reference to FIGS. 3 and 4. FIG. 3 is a flowchart showing example operation of the video predictive encoding/decoding method according to the present embodiment. FIG. 3 will be described below as the video encoding method. However, FIG. 3 is also applicable to the video decoding method.

First, meanings of variables used in FIG. 3 will be described. TR means display order information, TR_DDR means display order information of a DDR picture, TR_CUR means display order information of a processing target picture at a point of interest or at a time of processing the processing target picture such that the processing target picture is the current target picture, and RP means a state variable indicative of whether refreshment of the frame memory 104 is in standby. A case of RP=1 indicates a state in which after a DDR picture becomes a processing target, refreshment of the frame memory 104 has not yet been executed (i.e., a state in which refreshment of the frame memory is in standby), and a case of RP=0 indicates a state in which refreshment of the frame memory 104 has already been executed, or a state in which the refreshment process is not needed.

In FIG. 3, at a start of encoding of a video signal, first, TR_DDR and RP are initialized to 0 (step 301). Step 302 is to check whether RP=1 and whether TR_CUR of the processing target picture is larger than TR_DDR of the DDR picture. When these conditions are met, it is indicated that the frame memory refreshment is in standby and that the processing target picture is a picture in the series of pictures after a DDR picture, and thus the refreshing process of the frame memory 104 (i.e., a process of setting reference pictures stored in the frame memory 104, as unnecessary) is executed (step 303). It is, however, noted that the reference pictures stored in the frame memory 107 that are set as unnecessary are only reference pictures with the display order information TR smaller than the display order information of the most recent DDR picture (TR_DDR). The most recent DDR picture (or intra-frame predictive encoded picture) stored in the frame memory 104 is not set to be unnecessary. After completion of the refreshing process as described above, the state variable RP is set to RP=0.

On the other hand, when the aforementioned conditions are not met in step 302, the operation proceeds to step 304 to check whether the current processing target picture is a DDR picture. It is assumed in the video predictive encoding device 100 that the encoding type information about the encoding type of the picture (DDR, inter-frame predictive encoding, or bidirectional predictive encoding) is supplied through the input terminal 113 in FIG. 1 from a control device (not shown). When it is determined in step 304 that the current processing target picture is a DDR picture, step 305 is carried out to set the display order information TR_CUR of the current processing target picture to TR_DDR and to set the state variable RP to RP=1, and then the operation proceeds to step 306. On the other hand, when the condition is not satisfied in step 304, the operation proceeds to step 306.

Step 306 is to obtain a reproduced picture corresponding to the processing target picture. In this step, the processing target picture is encoded to obtain compressed data that is compressed by the encoding method described with reference to FIG. 1, and the compressed data is further decoded to obtain a reproduced picture (the reproduced picture corresponding to the processing target picture). The compressed data obtained by encoding is sent to the outside of the video predictive encoding device 100. Alternatively, the compressed data may be stored in a memory (not shown) that may be included in the video predictive encoding device 100. Next step 307 is to determine whether the reproduced picture corresponding to the processing target picture is to be used as a reference picture in a subsequent process. This determination is made based on the encoding type of the picture. It is assumed in the present embodiment that a DDR picture, a unidirectional predictive encoded picture, and a specific bidirectional predictive encoded picture all are determined to be used as reference pictures, which are stored. It is, however, noted that the present embodiments are not limited to these encoding types or determination method.

When it is determined in step 307 that the reproduced picture is not used as a reference picture, the reproduced picture is not stored in the frame memory 104 and the operation proceeds to step 309. On the other hand, if it is determined in step 307 that the reproduced picture is used as a reference picture, step 308 is carried out to store the reproduced picture in the frame memory 104, and then the operation proceeds to step 309.

At step 309 it is determined whether there is a next picture (unprocessed picture), and if there is a next picture, the operation returns to step 302 to repeat the processes of steps 302 to 308 for the next picture. The processes of steps 302 to 308 are repeatedly carried out until the last picture is processed. In this manner and, after completion of the processing for all the pictures, the processing of FIG. 3 is terminated.

By the above-described processing of FIG. 3, after completion of the processing of a random access picture (the most recent DDR picture herein), the frame memory 104 is refreshed at a time of processing a picture having display order information (TR) larger than TR_DDR (in fact, in step 303 before the process of step 306). The timing of refreshing the frame memory may be at any time after completion of the processing of the random access picture (the most recent DDR picture herein) when processing a picture with the display order information TR larger than TR_DDR, and may occur immediately after the process of step 306.

The aforementioned processing of FIG. 3 corresponds to the overall processing of the video predictive encoding device 100 in FIG. 1, and, particularly, the processes of steps 302 to 305 are carried out by the frame memory management unit 114.

FIG. 3 was described as the video encoding method, but is also applicable to the processing of the video decoding method. In execution of the decoding processing, step 301 further includes receipt of data of a compression-encoded picture (bitstream). The display order information and encoding type of a target picture are extracted from the data and the operations of steps 302 to 305 are carried out by the same method as above. In execution of the decoding process, step 306 carrys out a process of decoding the compressed data of the target picture to restore the picture. The processes of step 307 and the subsequent steps are as described above. This processing corresponds to the overall processing of the video predictive decoding device 200 in FIG. 2 and, particularly, the processes of steps 302 to 305 are carried out by the frame memory management unit 209.

Figure 4:
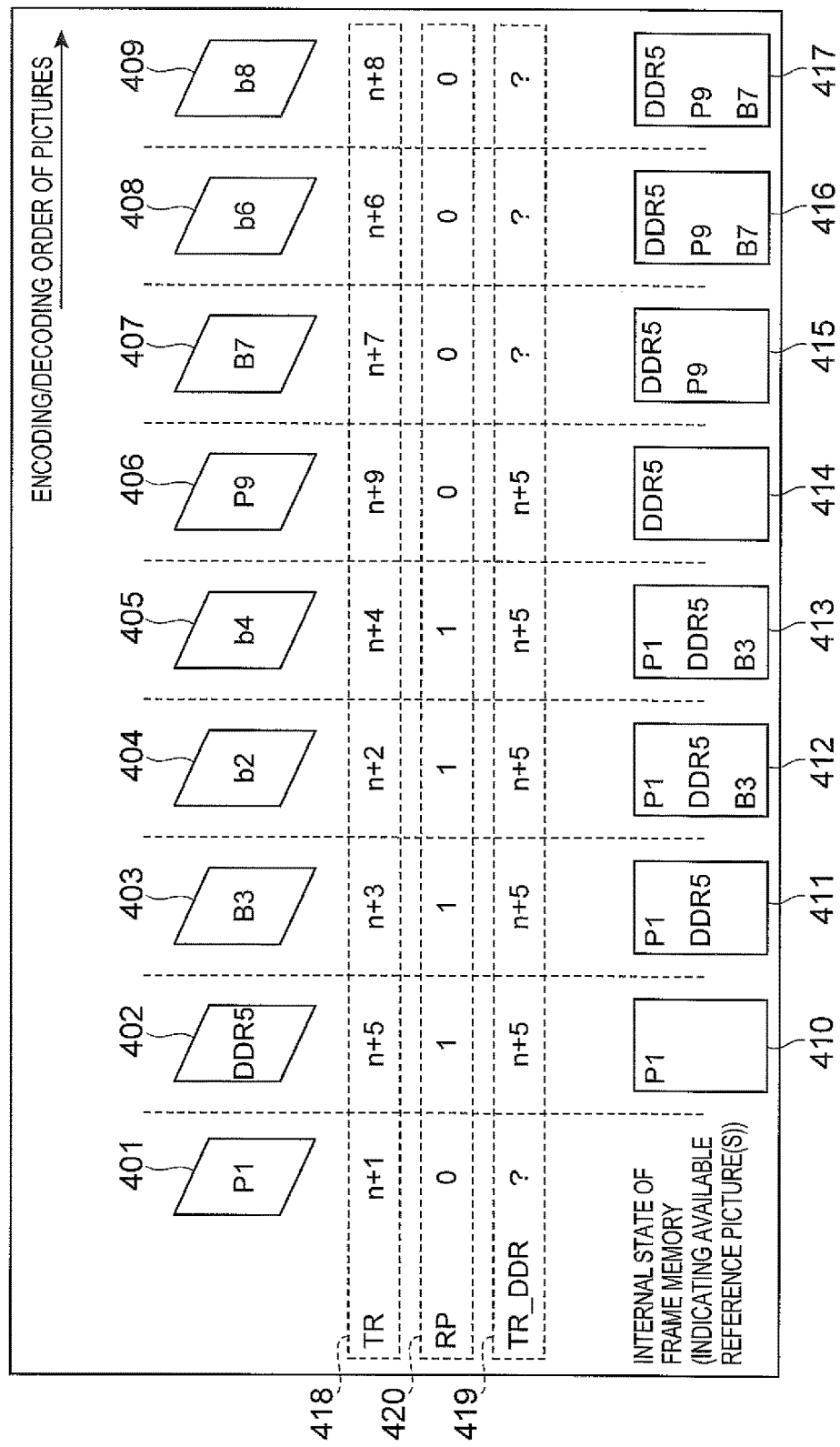
FIG. 4 is a schematic view illustrating an example of video predictive encoding/decoding in accordance with the example operation illustrated in FIG. 3.

FIG. 4 is a schematic diagram for explaining example processing of the video predictive encoding/decoding method according to the present embodiment. Pictures 401 to 409 shown in FIG. 4 are some of a series of pictures constituting a video sequence, and the picture 401 indicates a state in which there are n pictures prior thereto. Therefore, as shown in region 418 of FIG. 4, the display order information TR of picture 401 is represented by (n+1). Since the present embodiment is assumed to perform the encoding/decoding processing including bidirectional prediction, FIG. 4 shows a state in which the picture 402 with TR=(n+5) is first processed, and thereafter the pictures 403, 404, and 405, which are supposed to be displayed prior to the picture 402 are processed. For the same reason, the picture 403 with the display order of (n+3) is processed prior to the picture 404 with the display order of (n+2). This order is the same as in FIG. 11 (B). It is noted that "process a picture" hereinafter refers to "encode or decode a picture."

The identifiers written in frames of pictures 401 to 409 in FIG. 4 have the following meanings. Namely, "P" means a picture encoded by unidirectional prediction, "DDR" means a picture encoded as a DDR picture, and each of "B" and "b" means a picture encoded by bidirectional prediction. The pictures except for those indicated by uncapitalized b (i.e., pictures indicated by capitalized B, P, and DDR) all are assumed to be used as reference pictures. The value of RP for each picture in region 420 and the value of TR_DDR in region 419 in FIG. 4 are values immediately after completion of processing for each picture, but are not values at a start of processing for each picture (i.e., at the time of entry into step 302 in FIG. 3). For example, RP=0 at the start of the processing for the picture 402, but RP=1 immediately after completion of the processing for the picture 402.

In the processing of the picture 401, since the picture 401 is not a DDR picture, it results in RP=0. TR_DDR corresponding to the picture 401 may take any value, except a value stored by the preceding processing is set. Since the picture 401 indicated by capitalized P1 is used as a reference picture, it is stored into the frame memory.

Subsequently, the processing of the picture 402 will be described with reference to FIG. 3. At this time, the reproduced picture P1 is stored in the frame memory, as shown in region 410 in the bottom row in FIG. 4. Since RP=0 at the time of the start of processing of the picture 402, step 302 results in negative determination and the operation proceeds to step 304. Since the picture 402 is a DDR picture, step 304 results in positive determination and step 305 is carried out to set RP=1 and TR_DDR=n+5. Since the picture 402 is used as a reference picture, it is stored into the frame memory.

At a point of starting processing of the next picture 403, as shown in region 411 in FIG. 4, the pictures P1 and DDR5 are stored in the frame memory. At this time, RP=1, but the display order TR (n+3) of the picture 403 is smaller than TR_DDR (n+5) and the picture 403 is not a DDR picture; therefore, steps 302, 304 result in a negative determination and the picture 403 is encoded or decoded as it is (step 306). Since the picture 403 is used as a reference picture, it is stored in the frame memory.

On the occasion of processing the pictures 404 and 405, refreshment of the frame memory is still in a standby state (RP=1). Since the pictures 404 and 405 are not used as reference pictures, the pictures 404 and 405 are not stored into the frame memory as shown in regions 412, 413 in FIG. 4, while the pictures P1, DDR5, and B3 remain stored therein.

RP=1 at a point of a start of processing of the picture 406; since the display order information TR (n+9) of the picture 406 is larger than TR_DDR (n+5), step 302 results in positive determination and step 303 is carried out to set the reference pictures as unnecessary, to refresh the frame memory, and set RP=0. The reference pictures set as unnecessary at this time are only the reference pictures with the display order information TR smaller than that of the most recent DDR picture 402, except for the most recent DDR picture 402. Therefore, as shown in region 414 in FIG. 4, storage areas of the picture P1 and the picture B3 are released in the frame memory, with the result that only the picture DDR5 remains stored. The picture 406, which is used as a reference picture, is stored into the frame memory after completion of the processing of the picture 406, as shown in region 415 in FIG. 4, and thereafter the refresh control of the frame memory is carried out in the same manner as above.

Since the reference picture in the frame memory (picture P1 in FIG. 4) is not set as unnecessary, immediately after or immediately before the processing of the DDR picture 402 as described above, reference can be made to the picture P1 in the processing of the pictures 403, 404, and 405 processed after the DDR picture 402, and this contributes to an improvement in encoding efficiency. Since the most recent DDR picture 402 (picture DDR5) is not set as unnecessary in execution of refreshment of the frame memory after the processing of the DDR picture 402, the most recent DDR picture 402 (picture DDR5) can be used as a reference picture in the processing of the subsequent pictures 407, 408, and 409.

As described above, the present embodiment makes use of the display order information included with each respective picture to set the timing of the memory refreshment that is carried out after the processing of the intra-frame predicted picture (DDR picture) serving as a point of random access. The timing of the memory refreshment is based on the display order information, thereby achieving efficient compression encoding of pictures before and after a random access picture. It also resolves the inconveniences associated with the defects of the conventional technology, as described below.

Namely, since the display order information is always includes with each respective picture, there is no need for transmission of new information (flag), which resolves the defect 2 of the conventional technology. Furthermore, in the case of editing of a video signal (e.g., to discard some of pictures or to join different pictures), pieces of display order information of the respective pictures constituting the video signal are also appropriately set so as to cause no malfunction, which resolves the defect 1 of the conventional technology. Furthermore, since the timing of the memory refreshment according to the present invention is not limited to P pictures, and is independent of the encoding types of pictures (I pictures, P pictures, and B pictures), each picture is processed in an encoding type with the highest encoding efficiency, independent of the necessity of refreshment of the memory, which resolves the defect 3 of the conventional technology.

Another Embodiment

The foregoing embodiments describe the processing in the case where the display order information of each picture was encoded as an "absolute value." In another embodiment, the display order information of each picture is encoded as "difference value," in order to increase the encoding efficiency. The below will describe the embodiment in which the display order information is encoded as "difference value."

Figure 5:
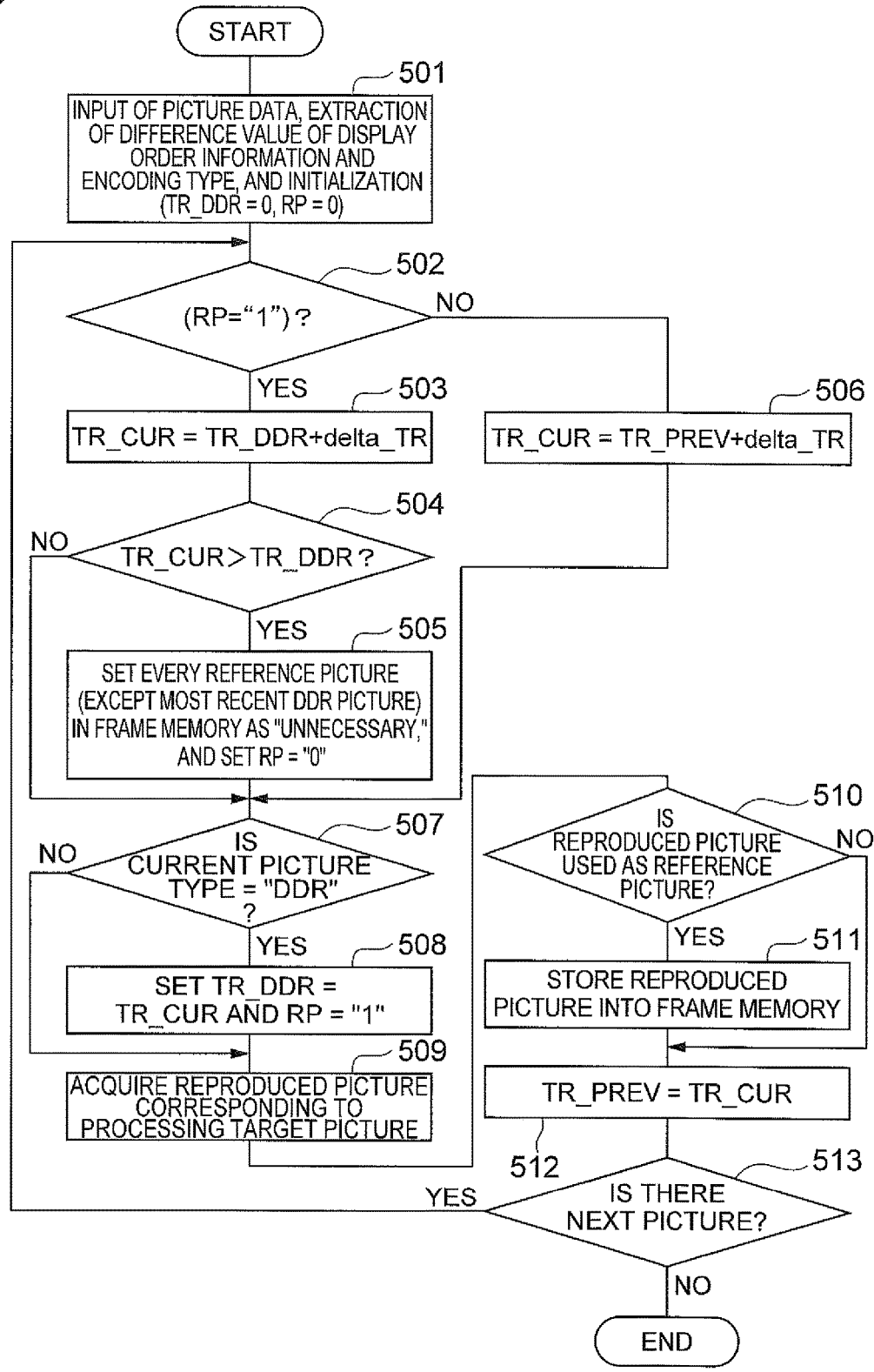
FIG. 5 is an example operational flowchart showing a video predictive encoding/decoding method according to another example embodiment.

FIG. 5 shows a flowchart of an operational example of another embodiment of the video predictive encoding/decoding method. In this embodiment the display order information of each picture is encoded as follows. Namely, for each picture that becomes a processing target during standby of refreshment of the frame memory (i.e. RP=1), a difference value between the display order information of the target picture and the display order information of the DDR picture is encoded. On the other hand, for each picture that becomes a processing target at a time when refreshment of the frame memory 104 has already been executed, or at a time when the refreshment process is not needed (i.e. RP=0), the display order information thereof is encoded by any method. For example, a difference from the display order information of the DDR picture may be encoded, or a difference from the display order information of an immediately preceding picture in the encoding order may be encoded.

In the example operation of this embodiment, FIG. 5 will be described as the video decoding method, but it should be understood that FIG. 5 is also applicable to the video encoding method. Step 501 in FIG. 5 is to receive input data of a compression-encoded picture into the video predictive decoding device 200, and to extract from the data, a difference value (delta_TR) of the display order information of the target picture, and information about the encoding type of the picture. At the same time, TR_DDR and RP are initialized to 0.

Next step 502 is to check whether RP=1. When this condition is met, it is meant thereby that the refreshment of the frame memory is on standby, and thus the operation proceeds to step 503. Step 503 is to set the display order information TR_CUR of the current processing target picture to the sum of TR_DDR and delta_TR.

Next, step 504 is to check whether TR_CUR is larger than TR_DDR. When this condition is met, it means that the refreshment of the frame memory is on standby (RP=1) and that the processing target picture is a picture after the DDR picture in the display order, and thus the refresh process of the frame memory 207 (i.e., a process of setting the reference pictures stored in the frame memory 207, as unnecessary) is executed (step 505). However, the reference pictures set as unnecessary are only the reference pictures with the display order information TR smaller than the display order information of the most recent DDR picture (TR_DDR). The most recent DDR picture (or intra-frame predictive encoded picture) is not set as unnecessary. After completion of the refresh process as described above, the state variable RP is set to RP=0. Thereafter, the operation proceeds to below-described step 507. When the aforementioned step 504 results in negative determination, the operation also proceeds to step 507.

On the other hand, when step 502 results in a negative determination (i.e. RP=0), the operation proceeds to step 506 to set TR_CUR to the sum of the display order information TR_PREV of a previously processed picture and delta_TR, and then the operation proceeds to step 507.

Step 507 is to check whether the current processing target picture is a DDR picture. The video predictive decoding device 200 can obtain the encoding type information about the encoding type of the picture (DDR, inter-frame predictive encoding, or bidirectional predictive encoding) from the compression-encoded data input from the outside.

When it is determined in step 507 that the current processing target picture is a DDR picture, step 508 is carried out to set the display order information TR_CUR of the current processing target picture to TR_DDR and set the state variable RP to RP=1, and then the operation proceeds to step 509. On the other hand, when the condition is not met in step 507, the operation proceeds to step 509.

Step 509 is to obtain a reproduced picture corresponding to the processing target picture. In this case, the reproduced picture corresponding to the processing target picture is obtained by decoding the compressed data of the processing target picture by the decoding method described with reference to FIG. 2. The reproduced picture obtained herein is sent, for example, external to the video predictive decoding device 200. Next step 510 is to determine whether the reproduced picture corresponding to the processing target picture is to be used as a reference picture in subsequent processing. This determination is made based on the encoding type of the picture. In this case, a DDR picture, a unidirectional predictive encoded picture, and a specific bidirectional predictive encoded picture all are determined to be reference pictures. It is, however, noted that the present invention is not limited to these encoding types or determination method.

When it is determined in step 510 that the reproduced picture is not used as a reference picture, the operation proceeds to step 512 without storing the reproduced picture into the frame memory 207. On the other hand, when it is determined in step 510 that the reproduced picture is used as a reference picture, step 511 is carried out to store the reproduced picture into the frame memory 207, and then the flow proceeds to step 512.

Step 512 is to set TR_CUR to TR_PREV, for the subsequent process of step 506, and then the operation proceeds to step 513. Step 513 is to determine whether there is a next picture (unprocessed picture), and if there is a next picture, the operation returns to step 502 to repeat the processes of steps 502 to 512 for the next picture. The processes of steps 502 to 512 are repeatedly carried out up to the last picture in this manner and after completion of the processing for all the pictures, the processing of FIG. 5 is terminated.

By the above-described processing operation of FIG. 5, after completion of the processing of a random access picture (the most recent DDR picture) the frame memory is refreshed at a time when a picture having display order information TR that is larger than TR_DDR is processed (in fact, in step 505 before the process of step 509). The timing of refreshment of the frame memory may be any time after completion of the processing of the random access picture (the most recent DDR picture herein), when processing a picture with display order information TR that is larger than TR_DDR, and may be a time immediately after the process of step 509.

The aforementioned processing of FIG. 5 corresponds to the overall processing of the video predictive decoding device 200 in FIG. 2 and, particularly, steps 502 to 508 are carried out by the frame memory management unit 209.

The operation of FIG. 5 was described as a video decoding method but it is also applicable to the processing of a video encoding method. In the case of execution of encoding processing, step 503 is to obtain delta_TR from the difference between TR_CUR and TR_DDR, and step 506 is to determine delta_TR from the difference between TR_CUR and TR_PREV, followed by entropy encoding. Furthermore, step 509 is to encode the target picture and then decode the picture. This processing corresponds to the overall processing of the video predictive encoding device 100 in FIG. 1 and, particularly, the processes of steps 502 to 508 are carried out by the frame memory management unit 114.

Figure 6:
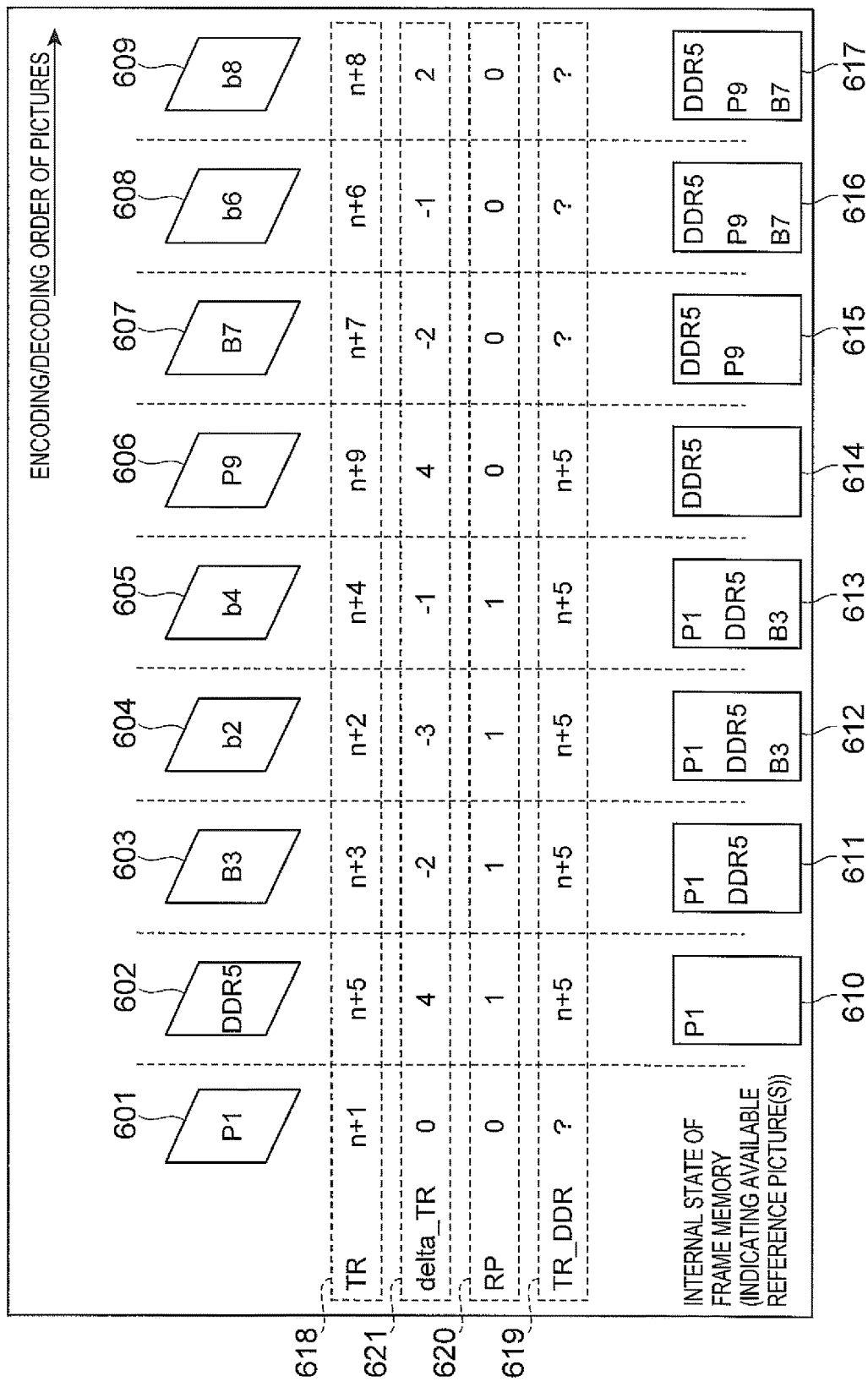
FIG. 6 is a schematic view illustrating an example of video predictive encoding/decoding in accordance with the example operation illustrated in FIG. 5.

FIG. 6 is a schematic diagram for explaining the processing of the video predictive encoding/decoding method according to the example embodiment of FIG. 5. Pictures 601 to 609 shown in FIG. 6 are some of a series of pictures constituting a video sequence and show the same processing as the pictures 401 to 409 described with reference to FIG. 4. However, FIG. 6 includes delta_TR shown in region 621, in addition to the regions of FIG. 4. As seen from region 621, determination of delta_TR is different depending upon the value of RP at a start of the encoding process of a target picture (the RP value of a previous picture). Namely, in the encoding processes of pictures 603 to 606, delta_TR is obtained as a difference value between TR of each picture and TR_DDR. In the encoding processes of picture 607 and the subsequent pictures, delta_TR is obtained as a difference value between TR of a target picture and TR of a picture immediately before the target picture. For example, TR of picture 607 is subtracted from TR of picture 606 to obtain delta_TR of picture 607. On the other hand, when the display order information TR is restored from the difference value delta_TR in the decoding process of each picture, the display order information TR is restored by adding the difference value delta_TR obtained by decoding the compressed data of the difference value, to TR_DDR. The processing thereafter is the same as that in FIG. 4 and is thus omitted herein.

In FIG. 6, even if the pictures 603 to 605 are missed by editing, since the display order information TR of the picture 606 is determined from TR_DDR, it can be correctly reconstructed as TR=delta_TR+TR_DDR=4+(n+5)=n+9, and the refreshment of the frame memory can be controlled without malfunction. If delta_TR of every picture is obtained as a difference value between the display order information of the picture and the display order information of a picture immediately before it in the decoding order, and if the picture 603 is missed, the display order information cannot be correctly reproduced and refreshment of the frame memory will be executed at the timing of the picture 605 (though, originally, the timing of the picture 606 is correct timing).

In the case where the embodiment of FIG. 6 is applied to the video encoding process, when encoding the display order information of each picture (pictures 603-606) and awaiting refreshment of the frame memory, after completion of the processing of the random access picture (the most recent DDR picture herein), the difference value delta_TR between the display order information TR of the current picture and the display order information TR_DDR of the DDR picture may be encoded, instead of encoding the display order information TR of the current picture itself, to thereby correctly decode the timing of refreshment of the frame memory. For this reason, even if a picture waiting for refreshment of the frame memory is lost, malfunction can be avoided, achieving an effect of high error resistance.

As still another example, the difference value delta_TR may be encoded for at least one picture which includes a picture for which the display order information TR is larger than the TR_DDR (picture 606 in FIG. 6), and which comes after the random access picture (the most recent DDR picture herein). Namely, when encoding the display order information of at least one picture which has display order information TR larger than TR_DDR (picture 606 in FIG. 6), and which comes after the random access picture (the most recent DDR picture herein), the difference value delta_TR between the display order information TR of the pertinent picture and the display order information TR_DDR of the DDR picture may be encoded, instead of encoding the display order information TR of the pertinent picture itself.

Video Predictive Encoding Program and Video Predictive Decoding Program

The embodiments of the video predictive encoding device can also be implemented with a video predictive encoding program for controlling a computer to function as the video predictive encoding device. Likewise, the invention of the video predictive decoding device can also be implemented with a video predictive decoding program for controlling a computer to function as the video predictive decoding device.

The video predictive encoding program and the video predictive decoding program are provided, for example, as stored in a recording medium, such as a non-transitory computer readable data storage medium. Examples of such recording media include recording media such as flexible disks, CD-ROMs, and DVDs, or recording media such as ROMs, or semiconductor memories or the like.

Figure 9:
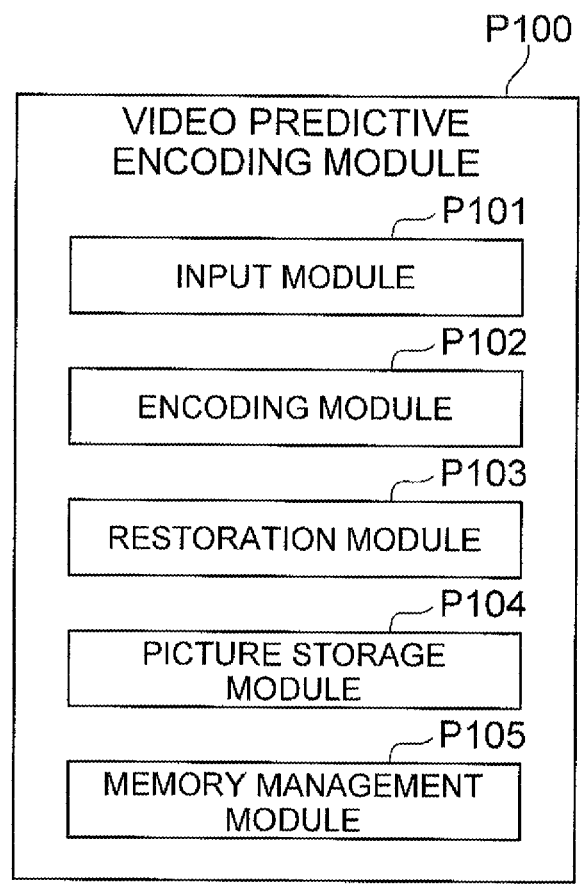
FIG. 9 is a block diagram showing a configuration example of a video predictive encoding system.

FIG. 9 illustrates an example of modules of the video predictive encoding program for controlling a computer to function as the previously discussed video predictive encoding device. As shown in FIG. 9, the video predictive encoding program P100 is provided with input module P101, encoding module P102, restoration module P103, picture storage module P104, and memory management module P105.

In the example of FIG. 9, the input module P101 may include, for example, at least part of the functionality described with regard to the input unit 101 and 113. The encoding module P102 may include, for example, at least part of the functionality described with regard to the block divider unit 102, the adder unit 105, the transformer 106, the quantizer unit 107, the entropy encoder unit 111, and the predicted signal generator unit 103. The restoration module P103 may include, for example, at least part of the functionality described with regard to the de-quantizer unit 108, and the inverse-transformer unit 109. The picture storage module P104 may include, for example, at least part of the functionality described with regard to the frame memory 104. The memory management module P105 may include, for example, at least part of the functionality described with regard to the frame memory management unit 114. In other examples, more or fewer modules may be used to describe the functionality of the video predictive encoding system. In addition, functionality described as included in an example module may be included in a different module, or may be divided among multiple modules that are executable by a processor included in one or more computers to control the functionality of the video predictive encoding device.

Figure 10:
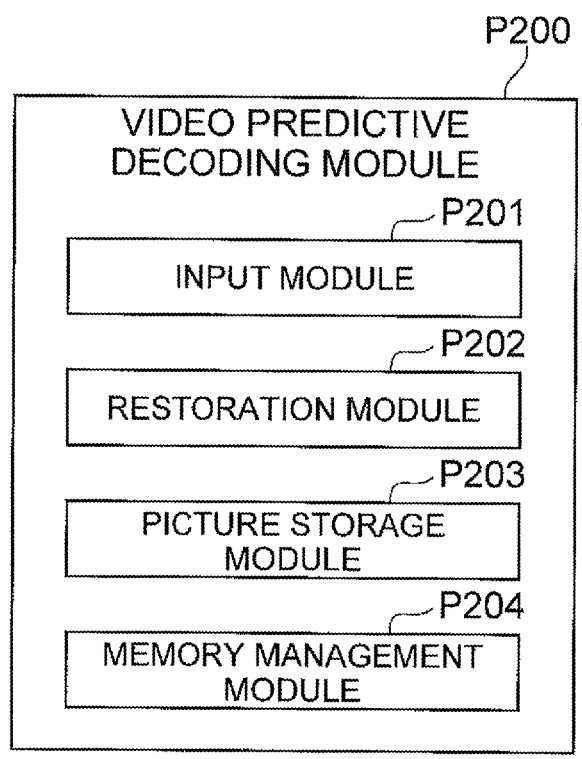
FIG. 10 is a block diagram showing a configuration example of a video predictive decoding system.

The computer may include one or more processors, such as a central processing unit (CPU), one or more digital signal processor, or some combination of different or the same processors. A processor may be a component in a variety of systems. A processor may be one or more general processors, digital signal processors, application specific integrated circuits, field programmable gate arrays, servers, networks, digital circuits, analog circuits, combinations thereof, or other now known or later developed devices for analyzing and processing instructions and data. A processor may implement a software program, such as code generated manually or programmed into memory, which may also include one or more units, or modules. The modules, functions, acts, or tasks illustrated in the figures and/or described herein may be performed by a programmed processor executing instructions stored in the memory. The modules, functions, acts or tasks may be independent of the particular type of instructions set, storage media, processor or processing strategy and may be performed by software, hardware, integrated circuits, firm-ware, micro-code and the like, operating alone or in combination. Processing strategies may include multiprocessing, multitasking, parallel processing and the like FIG. 10 shows modules of the video predictive decoding program for controlling a computer to function as the video predictive decoding device. As shown in FIG. 10, the video predictive decoding program P200 is provided with input module P201, restoration module P202, picture storage module P203, and memory management module P204 that are executable by the processor.

In the example of FIG. 10, the input module P201 may include, for example, at least part of the functionality described with regard to the input unit 201. The restoration module P202 may include, for example, at least part of the functionality described with regard to the data analyzer unit 202, the de-quantizer unit 203, the inverse transformer unit 204, the adder unit 205, and the predicted signal generator unit 208. The picture storage module P203 may include, for example, at least part of the functionality described with regard to the frame memory 207. The memory management module P204 may include, for example, at least part of the functionality described with regard to the frame memory management unit 209. In other examples, more or fewer modules may be used to describe the functionality of the video predictive decoding system. In addition, functionality described as included in an example module may be included in a different module, or may be divided among multiple modules that are executable by a processor included in one or more computers to control the functionality of the video predictive decoding device.

The video predictive encoding program P100 and the video predictive decoding program P200 configured as described above can be stored in a recording medium 10 shown in FIG. 8 and are executed by computer 30 described below.

Figure 7:
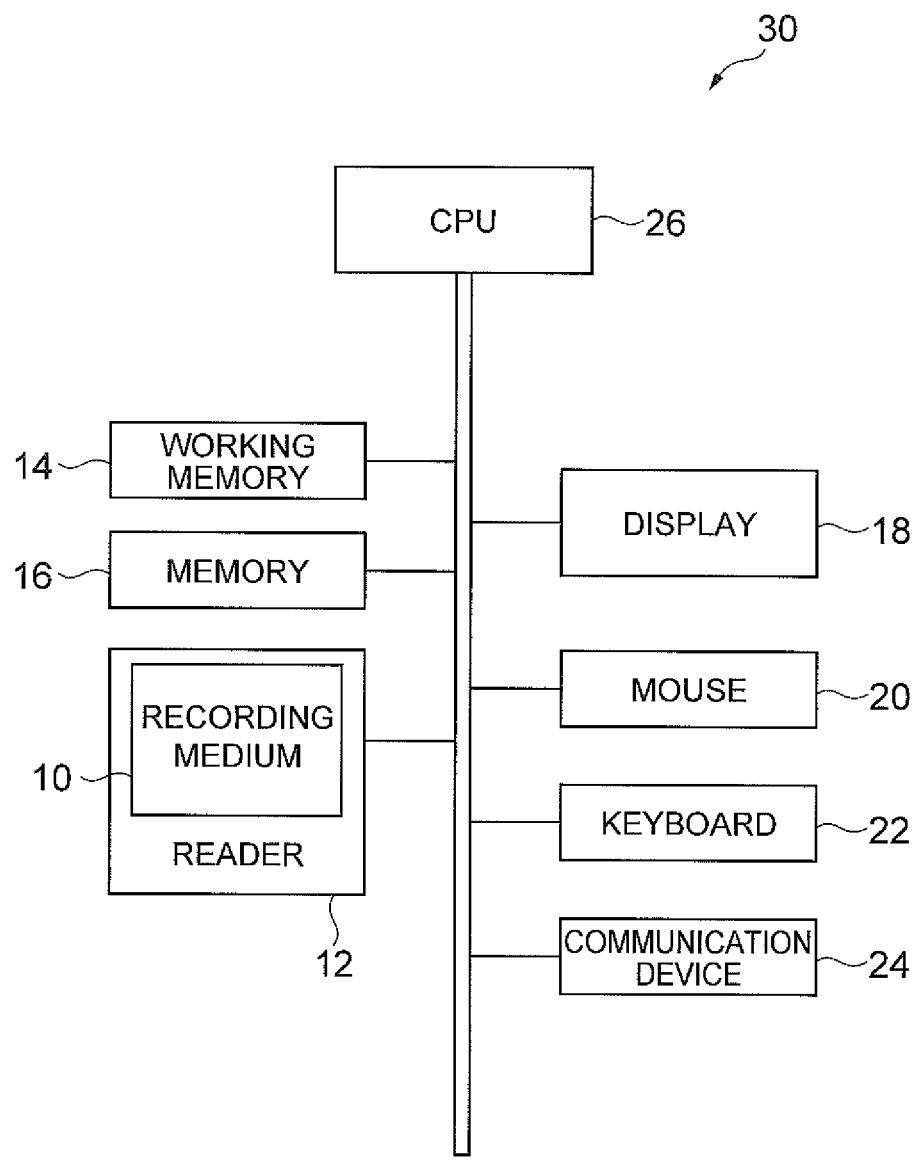
FIG. 7 is a drawing showing an example hardware configuration of a computer for executing a program recorded in a recording medium.
Figure 8:
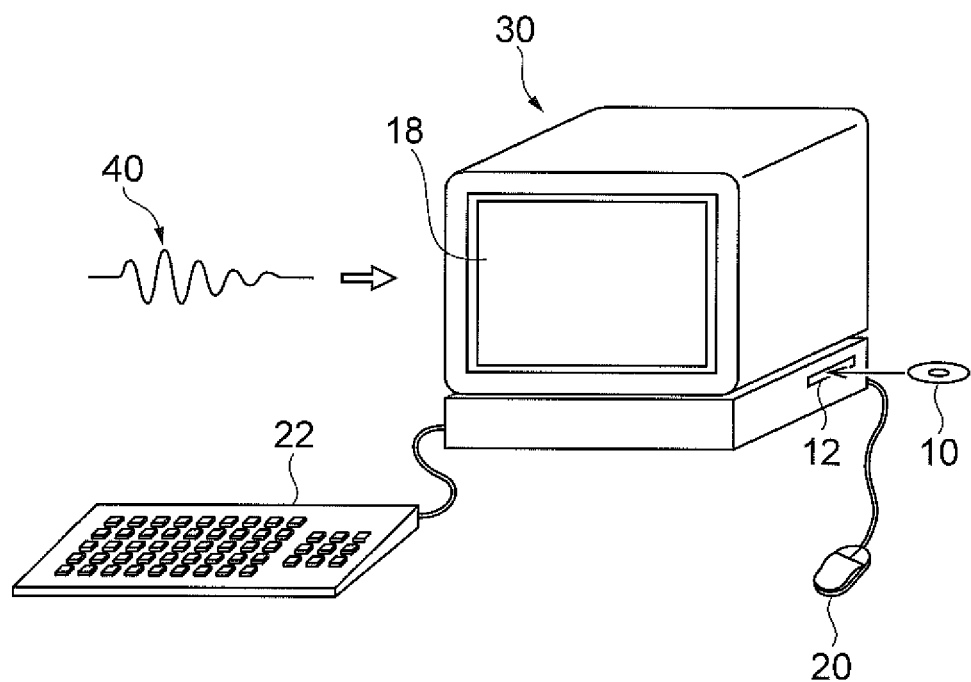
FIG. 8 is a schematic view of an example of a computer for executing a program recorded in a recording medium.

FIG. 7 is a drawing showing a hardware configuration of an example computer for executing a program recorded in a recording medium and FIG. 8 is a schematic view of an example computer for executing a program stored in a recording medium. The computer may be, a DVD player, a set-top box, a cell phone, etc. which are provided with at least one processor and are configured to perform processing and control by software, hardware, and some combination of software and hardware.

As shown in the example of FIG. 7, the computer 30 can be provided with a reading device 12 such as a flexible disk drive unit, a CD-ROM drive unit, or a DVD drive unit, a working memory (RAM) 14 in which an operating system is resident, a memory 16 for storing programs and data, which may also or alternatively be stored elsewhere, such as stored in the recording medium 10, a monitor unit 18 like a display, a mouse 20 and a keyboard 22 as input devices, a communication device 24 for transmission and reception of data or the like, and a CPU 26 for controlling execution of programs. In one example embodiment, when the recording medium 10 is put into the reading device 12, the computer 30 becomes accessible to the video predictive encoding program stored in the recording medium 10, through the reading device 12 and becomes able to operate as the video predictive encoding device according to the present invention, based on the video predictive encoding program.

Similarly, in another example, when the recording medium 10 is put into the reading device 12, the computer 30 becomes accessible to the video predictive decoding program stored in the recording medium 10, through the reading device 12 and becomes able to operate as the video predictive decoding device according to the present invention, based on the video predictive decoding program.

As shown in FIG. 8, the video predictive encoding program or the video predictive decoding program may be provided to the computer in the form of computer data signal 40 superimposed on a carrier wave, through a network. In this case, the computer 30 can execute the program after the video predictive encoding program or the video predictive decoding program received by the communication device 24 is stored into the memory 16, which is a non-transitory computer readable data storage medium.

LIST OF REFERENCE SIGNS

10: recording medium; 30: computer; 100: video predictive encoding device; 101: input terminal; 102: block divider; 103: predicted signal generator; 104: frame memory; 105: subtracter; 106: transformer; 107: quantizer; 108: de-quantizer; 109: inverse-transformer; 110: adder; 111: entropy encoder; 112: output terminal; 113: input terminal; 114: frame memory management unit; 200: video predictive decoding device; 201: input terminal; 202: data analyzer; 203: de-quantizer; 204: inverse-transformer; 205: adder; 206: output terminal; 207: frame memory; 208: predicted signal generator; 209: frame memory management unit; P100: video predictive encoding program; P101: input module; P102: encoding module; P103: restoration module; P104: picture storage module; P105: memory management module; P200: video predictive decoding program; P201: input module; P202: restoration module; P203: picture storage module; P204: memory management module.

The invention claimed is:

1. A video predictive decoding method to be executed by a video predictive decoding device with picture storage memory to store reference pictures used to decode a subsequent picture, comprising:
    an input step of accepting input of compressed picture data including a random access picture serving as a picture of random access, the compressed picture data obtained by encoding each of a plurality of pictures constituting a video sequence by a method of either intra-frame prediction or inter-frame prediction, and the input step also accepting input of display order encoded data obtained by encoding data providing display order information of each of the pictures;
    a restoration step of decoding the compressed picture data to restore a reproduced picture and decoding the display order encoded data to restore the display order information;
    a picture storage step of storing, in the picture storage memory, the restored reproduced picture as the reference picture to be used for decoding the subsequent picture; and
    a memory management step of controlling the picture storage memory, and
    wherein after completion of a decoding process of decoding the random access picture, in the memory management step, the video predictive decoding device refreshes the picture storage memory by setting every reference picture stored in the picture storage memory, except for the random access picture, as not used as reference pictures, immediately before decoding a picture having display order information larger than the display order information of the random access picture, and wherein the picture having display order information larger than the display order information of the random access picture is independent of encoding types of pictures.

2. A video predictive decoding device comprising:

a processor;

an input terminal executable by the processor to accept input of compressed picture data including a random access picture serving as a picture of random access, the compressed picture data obtained by encoding each of a plurality of pictures constituting a video sequence by a method of either intra-frame prediction or inter-frame prediction, and the input terminal further executable by the processor to accept input of display order encoded data obtained by encoding data providing display order information of each of the pictures;

a restoration unit executable by the processor to decode the compressed picture data to restore a plurality of reproduced pictures, and the restoration unit further executable by the processor to decode the display order encoded data to restore the display order information;

a picture storage memory to store the restored reproduced pictures as reference pictures to be used for decoding a subsequent picture; and a memory management unit executable by the processor to control the picture storage memory, wherein after completion of a decoding process of decoding the random access picture, the memory management unit refreshes the picture storage memory by setting every reference picture stored in the picture storage memory, except for the random access picture, as not used as reference pictures, immediately before decoding a picture having display order information larger than the display order information of the random access picture, and wherein the picture having display order information larger than the display order information of the random access picture is independent of encoding types of pictures.

* * * * *